United States Patent

[11] 3,561,408

[72] Inventor Philip Weiand
Glendale, Calif. (2737 San Fernando Road, Los Angeles, Calif. 90065)
[21] Appl. No. 010,912
[22] Filed Feb. 12, 1970
[45] Patented Feb. 9, 1971

[54] HIGH RAM MANIFOLD
10 Claims, 14 Drawing Figs.

[52] U.S. Cl. ................................................. 123/52,
123/55, 123/59, 123/119, 123/139, 123/188
[51] Int. Cl. ....................................................F02b 75/18,
F02b 75/22, F02b 75/20
[50] Field of Search........................................... 123/52
(MU), 52 (M), 55 (U8), 55 (UX), 55 (U6), 55
(U4), 52, 188 (1M), 122, 139.17, 59

[56] References Cited
UNITED STATES PATENTS

| | | | |
|---|---|---|---|
| 2,762,350 | 9/1956 | Mann et al. | 123/55(U8) |
| 2,806,457 | 9/1957 | Mosley | 123/52(MU) |
| 2,845,911 | 8/1958 | Gill | 123/52(MU) |
| 2,857,893 | 10/1958 | Lobdell | 123/55(U8) |
| 2,909,165 | 10/1959 | Dolza | 123/52(MU) |
| 2,911,967 | 11/1959 | Kierhaefer | 123/52(MU) |
| 2,947,293 | 8/1960 | Arkus-Duntov | 123/52(MU) |

Primary Examiner—Wendell E. Burns
Attorney—Georges A. Maxwell

ABSTRACT: An intake manifold to be arranged with and adapted to conduct fuel and air between carburetor means and the inlet ports of an internal combustion engine including a plurality of compound curved tunnels with inlet ends in axial alignment with the discharge of the carburetor means and outlet ends corresponding in cross-sectional configuration and in registering open communication with related inlet ports, the inlet ends and the major longitudinal extent of the tunnels related thereto being D-shaped in cross section with their flat sides at and extending along the outside curvature of the tunnels, the minor portion of the tunnels adjacent their outlet ends joining smoothly with the D-shaped portions thereof and a plenum chamber between the inlet ends of the tunnels and the carburetor means communicating with the carburetor means and the tunnels to balance the pressures therebetween.

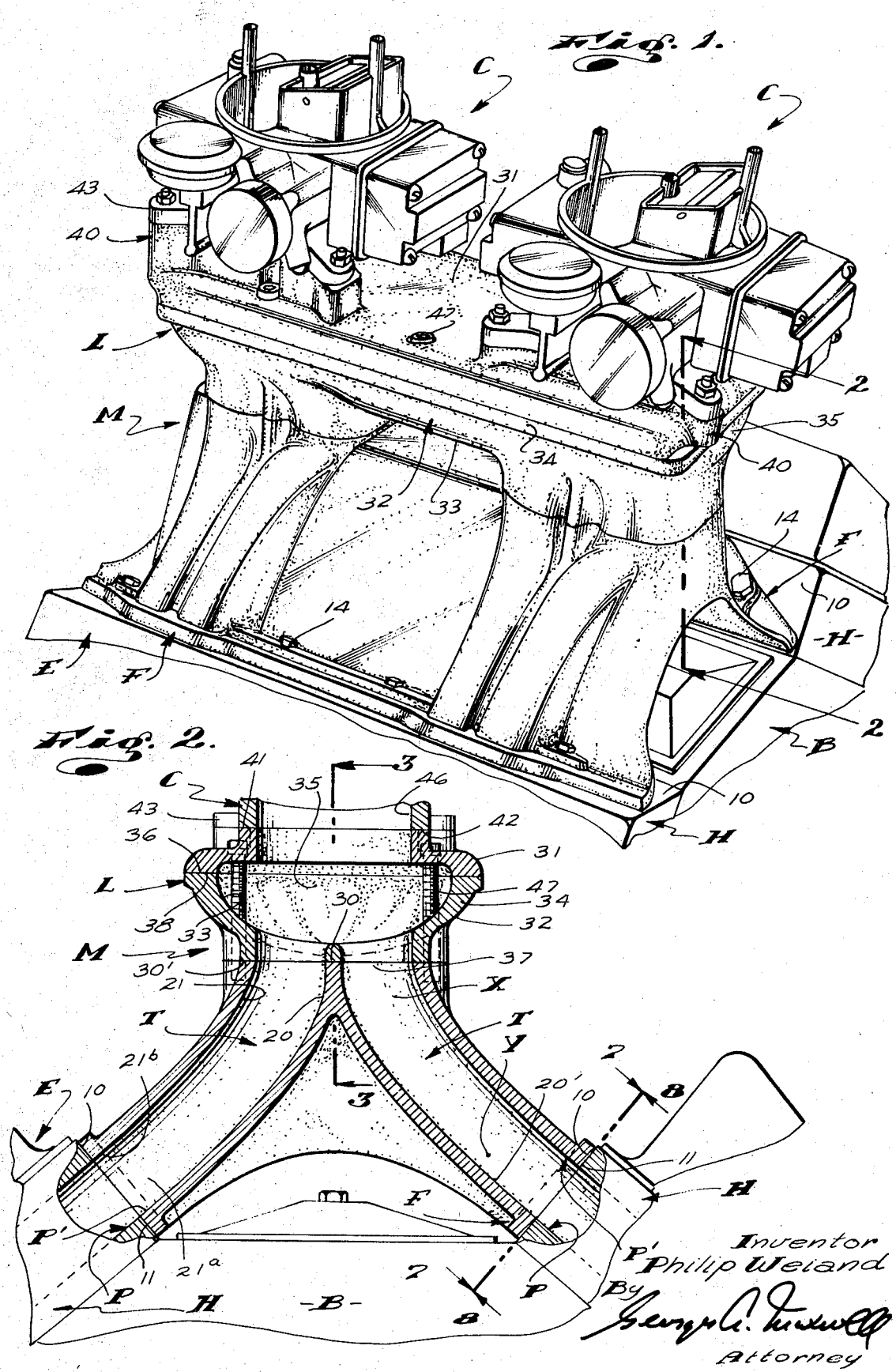

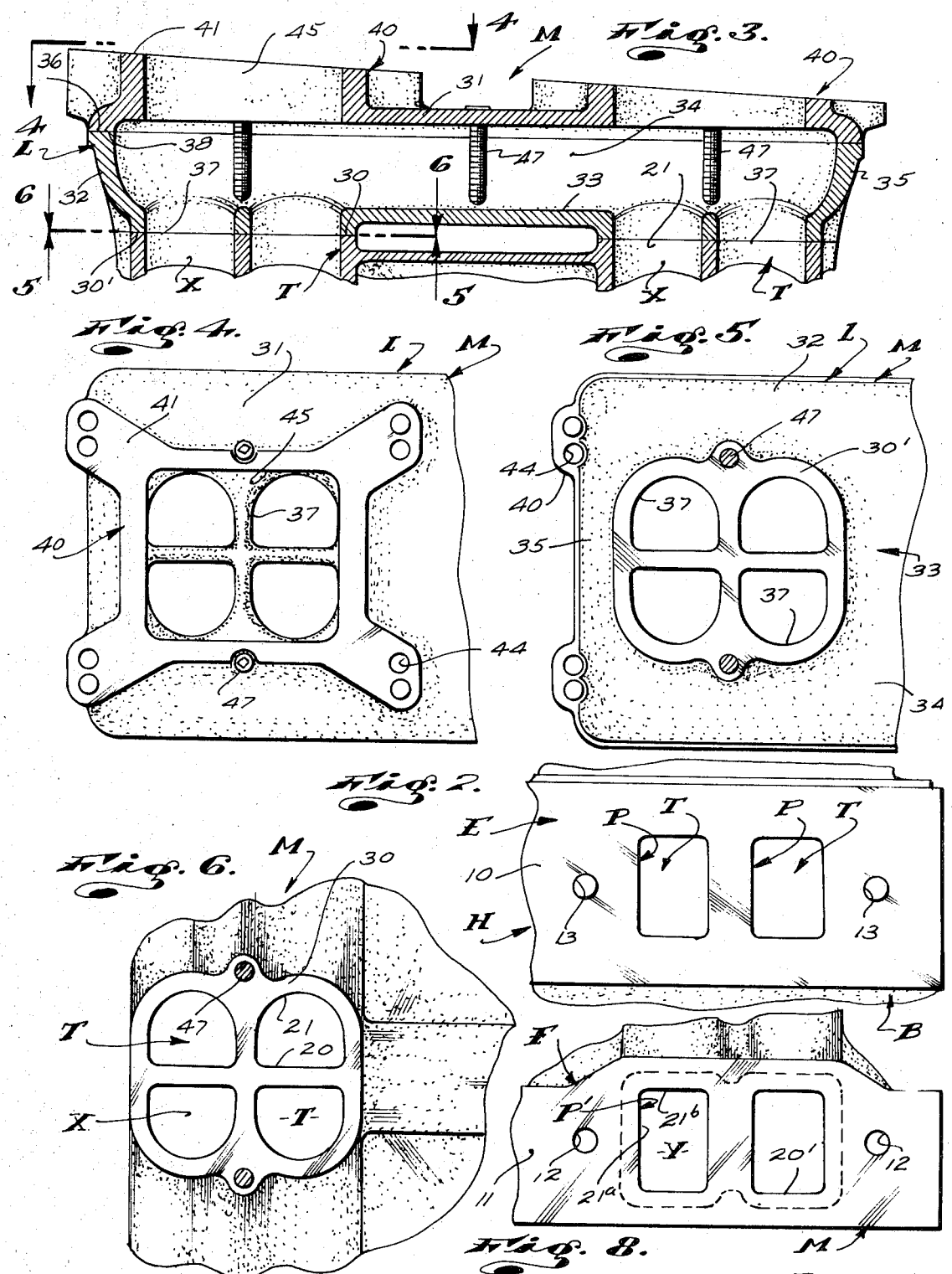

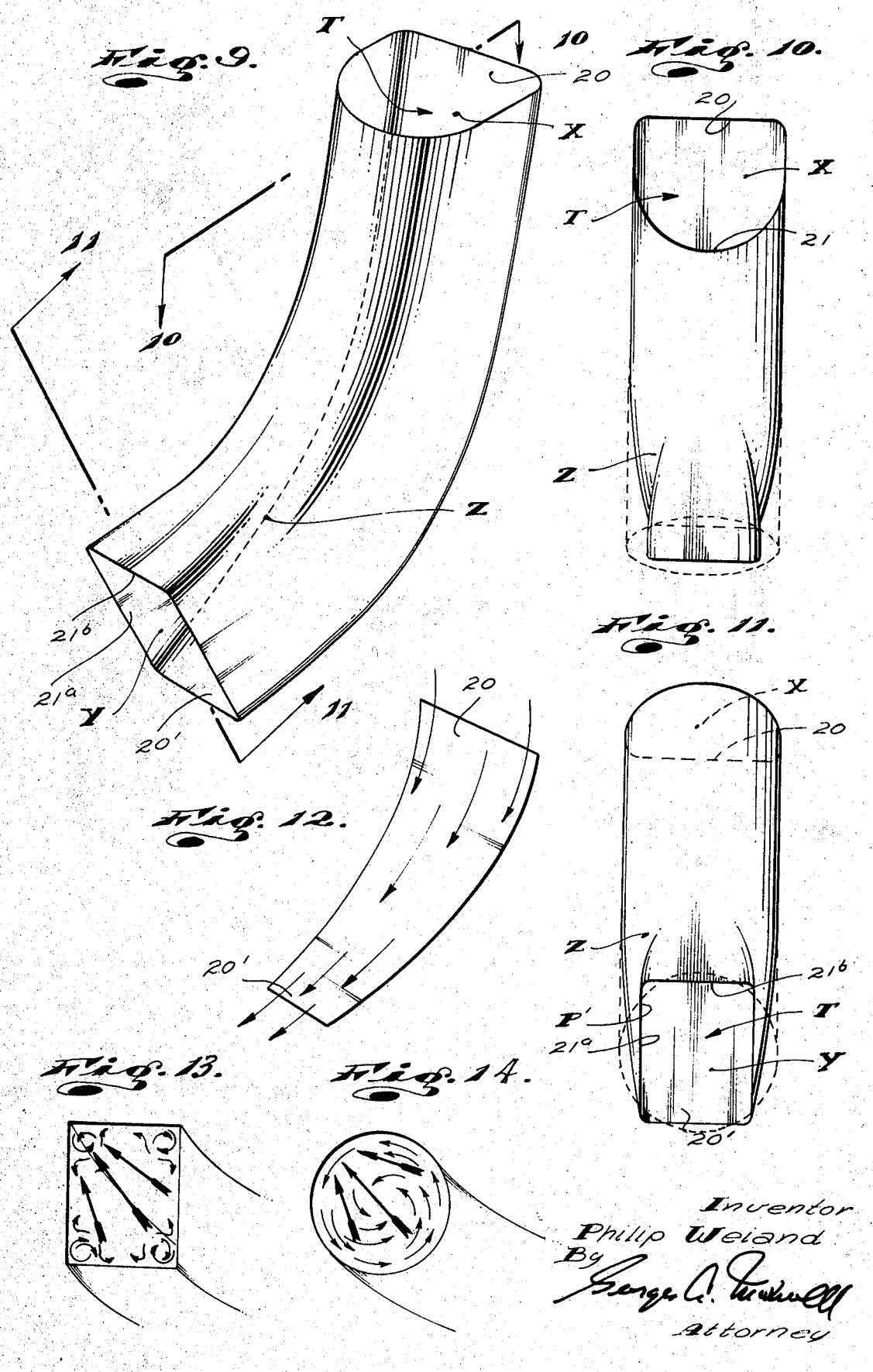

HIGH RAM MANIFOLD

This invention has to do with a novel improved air fuel intake manifold for reciprocating internal combustion engines and is more particularly concerned with an intake manifold of the general character referred to having ducts or tunnels of novel configuration to conduct fuel-air mixture from a related carburetor to the inlet ports of a related engine.

Throughout the years, considerable effort has been expended to increase the efficiency and power output of multicylinder internal combustion engines for automobiles and the like.

In endeavoring to increase the efficiency and power output of such engines, one critical portion or means thereof that must be considered is the fuel supply means, which means includes, in addition to other servo components, elements and parts, such as a fuel pump and control linkage, one or more carburetors to meter liquid fuel such as gasoline and to mix the fuel with air and a ducting device, commonly referred to as an intake manifold to conduct the mixture of fuel and air to the several intake ports in the cylinder heads of the engines. The intake ports are provided with and/or are under control of timed, cam operated intake valves and cooperate with their related valves to intermittently conduct the fuel-air mixture conducted thereto by the manifold, into their related cylinders of the engine.

The inlet ends of the inlet ports in the heads of the engines are, as a general rule, rectangular in cross section, though some are round or circular in cross section.

The ducts or tunnels in the intake manifolds are, like the inlet ports, either rectangular or round in cross section.

It is understood and believed that the inlet ports and manifold tunnels were universally round in cross section in the early development of automotive internal combustion engines. It was later discovered or determined that round tunnels permitted or induced a circular or vortex flow of the fuel and air as it traveled therethrough, with the result that the particles of the heavy fuel were centrifugally separated from the air and cast upon the inside surfaces or walls of the tunnels and simply ran or flowed along to reach the inlet ports. The above was, obviously, undesirable.

So as to avoid the vortex flow and resulting fuel separation noted above, the configuration of the inlet ports and manifold tunnels was changed to a square or rectangular configuration which configuration effectively impeded the establishment of vortex flow and the noted separation of fuel and air.

The above-noted rectangular cross-sectional configuration of ports and ducts has become recognized as most desirable and is in widest present day use.

While rectangular manifold tunnels do effectively prevent or impede vortex flow of fuel and air as it moves therethrough, I have found that in the longitudinally extending corners of such tunnels, where the adjacent walls of the tunnel converge, turbulence is created which impedes the free flow of fuel and air therethrough and delays the flow of fuel and air through the tunnels to a measurable extent. Though the noted delay may appear to be little, it is indicative of a deficiency and inefficiency of the tunnel configuration.

It is also believe inevitable that the turbulence created in the corners of rectangular manifold tunnels results in urging some of the fuel droplets into combining engagement with other of the fuel droplets and so that the fuel becomes less evenly divided in and with the air as the mixture moves longitudinally through the tunnels.

As a general rule, the tunnels of intake manifolds are not straight, but rather, are curved to varying extends as they extend from their related carburetors to their related inlet ports.

In the case of curved manifold tunnels which are round in cross section, the rounded walls, about the outer side or curvature of the tunnels establish what is, in effect, curved, converging, inclined planes. The centrifugal forces acting on the column of fuel and air, as it is caused to turn in such tunnels urges the fuel and air into the an narrowest possible portion of the outside curvature of the tunnel, with the result that the heavier fuel is urged radially outward, the fuel air mixture is not even or uniform, and much of the fuel is deposited onto the wall of the tunnels.

In the case of rectangular, curved, manifold tunnels, the above-noted urging of the fuel and air into a confining corner about the outside curvature of tunnels does not ordinarily occur, but for short distances about compound curve when the outer side of the turning column of air is caused to move or switch from one flat side of the tunnel to another or adjacent flat side.

To my knowledge, no one has made a compound curved rectangular manifold tunnel in which the flat sides of the tunnel are established in a corresponding compound curve and so that one flat side of the tunnel remains constantly about and normal to the outside of the curvature of the tunnel.

An object of my invention is to provide a novel intake manifold tunnel configuration wherein the tunnel is D-shaped, whereby advantages to be found in round and rectangular tunnels are obtained and the disadvantages to be found in round and rectangular tunnels are avoided.

It is an object and feature of my invention to provide a D-shaped manifold tunnel which is such that the single straight side of the tunnel impedes the establishment of a vortex flow of fuel and air flowing therethrough and which is such that only two corners are established in and along which flow impeding turbulence might develop, instead of four, as is the case in rectangular tune tunnels.

Yet another object and feature of the instant invention is to provide a simple or compound curved, D-shaped intake manifold tunnel wherein the flat side of the tunnel extends about and is parallel with the outside curvature of the tunnel whereby the flat side acts as a flat, slidelike surface which directs and turns the column of fuel and air and so that no corner or converging planes or surfaces occur about the outside curvature of the tunnel and into which the fuel and air is or might be urged by centrifugal forces.

It is an object of my invention to provide a novel D-shaped manifold tunnel of the character referred to above which is such that it is applicable for use in substantially any form, tyle and type of intake manifold and is such that it will effect notable increase in the efficiency and effectiveness of such manifold.

It is an object and feature of my invention to provide a novel intake manifold tunnel which is D-shaped in configuration throughout the major part of its longitudinal extent and which has an outlet end portion of limited longitudinal extent which is round or rectangular in cross section to register with a related round or rectangular inlet port and the inner part of which joins and fares smoothly with and into the D-shaped portion of the tunnel.

In addition to the foregoing it is an object of my invention to provide a novel high performance intake manifold adapted to cooperatively receive and mount a pair of carburetors and including a pressure equalizing and stabilizing plenum chamber between the carburetors and the upper inlet ends of elongate, downwardly extending and outwardly curved D-shaped tunnels extending to the inlet ports of a related engine.

It is an object and feature of my invention to provide a manifold of the character referred to wherein the upper inlet ends of the D-shaped tunnels are in vertical alignment with the lower discharge ends of the carburetors with which they are related and so that the primary flow or column of fuel and air discharged by the carburetors flows freely, uninterrupted and downwardly through the plenum changer and into the inlet ends of the tunnels related thereto.

Another object and feature of my invention is to provide a plenum chamber of the character referred to which is less in vertical extent than in longitudinal or lateral extent and which is no greater in vertical extent than the major cross-sectional extent of the discharge end of the carburetors whereby the chamber effectively equalizes and stabilizes the pressure in the manifold between the carburetors and across and between the upper ends of the tunnels, but is not of sufficient extent as to impede the direct and free flow of fuel and air downwardly from the carburetors and into the upper inlet ends of the tunnels aligned therewith.

The provision of plenum chambers is in or connected with intake manifolds, designed for mounting two carburetors and positioned between the inlet ends of the manifold tunnels and the carburetors is not new, however, to the best of my knowledge, such chambers have been designed, proportioned and arranged in such a way as to create great turbulence of the air and fuel mixture issuing from the carburetors and so that it is better mixed and blended before it enters the tunnels for delivery to the engines. The balancing and equalization of pressures in such structures takes place, but is not generally believed to be as significant as the mixing and blending of air and fuel sought to be gained.

In the instant invention the plenum chamber is believed distinct from such chamber provided by the prior art since the blending of fuel and air by turbulence is minimized, straight, free columnar flow of fuel and air through the chamber and into the tunnels is made possible and the equalizing and stabilizing of pressures is the primary end sought to be gained.

The foregoing and other objects and features of my invention will be apparent from the following detailed description of a typical preferred form and application of my invention, throughout which description reference is made the accompanying drawings, in which:

FIG. 1 is an isometric view of my new manifold showing it related to a portion of an internal combustion engine and a pair of carburetors;

FIG. 2 is a sectional view taken substantially as indicated by line 2–2 of FIG. 1;

FIG. 3 is a sectional view taken as indicated by line 3–3 on FIG. 2;

FIG. 4 is a sectional view taken as indicated by line 4–4 on FIG. 3;

FIG. 5 is a sectional view taken as indicated by line 5–5 on FIG. 3;

FIG. 6 is a sectional view taken as indicated by line 6–6 of FIG. 3;

FIG. 7 is a sectional view taken as indicated by line 7–7 on FIG. 2;

FIG. 8 is a sectional view taken as indicated by line 8–8 of FIG. 2;

FIG. 9 is a perspective drawing illustrating the configuration of the novel D-shaped tunnel that I provide;

FIG. 10 is a view taken substantially as indicated by line 10–10 on l FIG. 9;

FIG. 11 is a view taken substantially as indicated by line 11–11 on FIG. 9;

FIG. 12 is a perspective drawing illustrating the nature of the flat side of my new D-shaped tunnel configuration;

FIG. 13 is a diagrammatic view of a rectangular tunnel; and,

FIG. 14 is a diagrammatic view of a round or circular tunnel.

In FIG. 1 of the drawing I have illustrated a preferred form and embodiment of my new manifold M, shown engaged with or mounted on related portions of an internal combustion engine E and having a pair of carburetors C mounted on the related thereto.

The engine E is a V-type engine having an elongate block B and a pair of laterally spaced, longitudinally extending, laterally upwardly and outwardly projecting cylinder heads H mounted thereon. The heads H have substantially flat, laterally inwardly and upwardly disposed sides 10 with longitudinally spaced inlet ports P opening therein and which are adapted to communicate with the manifold M and conduct fuel and air delivered by the manifold into those cylinders in the engine with which the ports are related.

In so the form of the invention illustrated, the ports P, as clearly shown in FIG. 7 of the drawings, are rectangular in cross section.

It is to be noted that, in practice, the ports P could be round in cross section, without affecting the spirit of the present invention.

The number of ports P in the heads H and their spacing and arrangement longitudinally thereof can and does vary from one make and model of engine to another and a special manifold M design must be provided for each make and model of engine having a different number and arrangement of ports than other engines and for which a manifold embodying the present invention is to be provided.

It is to be further noted that manifolds embodying the present invention are not limited for use in connection with V-type engines such as referred to above, but can be established for and used in connection with straight-block or inline type engines wherein a single ported cylinder head is provided.

In the manifold M illustrated and in each different form and style of manifold embodying the invention a flat, platelike head-engaging mounting flange F is provided to engage and seat on the ported side 10 of each head H. The mounting flanges F have flat, head-engaging surfaces 11 which oppose the surfaces 10, ports P′ which correspond in arrangement and configuration with the ports P to register therewith and have suitably arranged and spaced fastener receiving openings 12 which register with fastener receiving openings 13 in the heads and in and through which suitable fasteners 14 are engaged to secure the manifold to the heads.

In practice, a suitable gasket (not shown) is or can be provided between the mounting flanges F and the heads H, if necessary or desired.

The a manifold M next includes a plurality of elongate substantially upwardly and inwardly extending tunnels T, there being one tunnel T related to and communicating with each port P′ in the flanges F and extending upwardly and inwardly toward the carburetor or carburetors C related to the manifold, as will hereinafter be described.

The ports P′ are, in effect, established by the lower outlet ends of the tunnels T. In practice, the tunnels T are generally established of substantially equal, predetermined length and cross-sectional area and are curved or other than straight. In the majority of cases the tunnels T are curved laterally inwardly and upwardly and are frequently provided with compound curves longitudinally of the manifold so that the upper portions of the several tunnels converge in such a manner that their upper ends terminate in a common horizontal plane and are in side-by-side by grouped relationship. Such grouped relationship of the upper ends of the tunnels is desired and/or required so that the upper ends of said tunnels are properly oriented and arranged to receive the fuel-air mixture discharged by the carburetor or carburetors related to the manifold.

In the case illustrated the manifold M is provided with eight tunnels T and has two longitudinally spaced carburetors C mounted thereon. Accordingly, the number of tunnels is divided equally into two groups of four, longitudinally of the construction, and so that the upper ends of the two groups of tunnels occur in vertical alignment with the spaced carburetors C. As a result of the above, the tunnels T are curved upwardly and inwardly and have limited or indiscernable longitudinal compound curvature.

The tunnels T are of special, unique and varying cross section throughout their longitudinal extent and are such that they more efficiently and effectively conduct fuel and air from the carburetors downwardly and into the inlet ports P in the heads H.

The upper, major portion X of each tunnel T is D-shaped in cross section while the lower, minor portion Y thereof corresponds in cross section with the shape of the port in the cylinder head with which the tunnel is related.

In the case illustrated the lower portion Y is rectangular and corresponds in cross section with the port P in the head H with which it is related.

It is to be understood that, in the event the port in the head was round or circular, the lower portion of the tunnel would be round or circular.

The straight, flat side 20 of the upper D-shaped portion X of each tunnel is arranged to occur on and extend along the outside curvature of the tunnel. In the case illustrated, the tunnels are curved radially inwardly and upwardly. Accordingly, the outside curvature on and along which the flat side 20 occurs or extends is at the inner side of the tunnel with respect to the central longitudinal axis of the manifold M.

In accordance with the above the other rounded, semicircular portion or side 21 of the tunnel occurs at and extends along the inside curvature of the tunnel, at the outside of the tunnel with respect to the central axis of the manifold.

The flat, downwardly and outwardly curved side 20 on the outside curvature of the upper portion X of the tunnel continues downwardly and outwardly to define what is, in the instant case, the lower side 20' of the rectangular lower portion Y of the tunnel.

The related side 20 and 20' of the tunnel sections X and Y define a flat, downwardly and outwardly curved, radially inwardly or upwardly and outwardly disposed ramp or slide surface along which fuel and air flows downwardly through the tunnel and which serves to direct and change the direction of flow of said fuel and air about the curvature of the tunnel.

The flat ramp or slide surfaces thus defined impedes the start or generation of circular or vortex flow in the downwardly moving column of air and fuel in the tunnel and is of considerable lateral extent, whereby the reactive, centrifugallike forces in the column of fuel and air, as it is caused to blend or flow about the curvature of the tunnel is widely distributed in and across a plane normal to the line of curvature and so that it is not caused to compress excessively and so that the tendency for the heavy fuel particles or droplets to move outwardly in the column and separate therefrom, is maintained at a minimum.

The outer rounded or semicircular side 21 of the portion X of each tunnel maintains the column of fuel and air flowing through said portion of the tunnel, confined, properly directed and is void or free of inside corners or other breaks in configuration which would or might tend to establish eddy currents, turbulence or the like, which would or might tend to interfere with or impede the free flow of the column of fuel and air through the portion X of the tunnel.

The lower end of the side 21 of the portion X is, in effect, flared outwardly and the inner end ends of the side and outer walls 21$^a$ and 21$^b$ of the lower portion Y of the tunnel T are suitably formed and turned to join smoothly with and fare into the flared portions of the side 21.

Otherwise described, the two opposite sides 21$^a$ and the upper or outer side 21$^b$ of the lower rectangular portion Y of each tunnel are joined with the outer side 21 of the upper portion X by a curved and shaped intermediate outer side Z whereby the outer rounded and polygonal portions of the tunnels are made to fare smoothly, one into or with the other and so that the transition between the D-shaped and rectangular portions is smooth and is such that little or no flow impeding turbulence is created in the column of fuel and air as it moves downwardly and outwardly from the portion X into the portion Y of the tunnel.

Referring to the drawings, FIGS. 9 through 12 are drawings of the planes and surfaces of the tunnels T described in the foregoing and are not intended to illustrate that structure which defines the planes and surfaces illustrated thereby.

In practice, the manifold can be a fabricated metal structure in which case the tunnels T can be established of suitably formed sheet metal or tubing, or can, as illustrated, be a unitary or sectional structure established as being cast or the like. In either case the tunnels are established with the above-noted special and unique cross-sectional configurations.

It is to be noted that when the ports P and P' of a related manifold and cylinder head are circular or round, the lower portion Y of the tunnels related thereto are round rather than rectangular as above described. In such a case the flat inner side of the upper portion X of each tunnel fares into and with the rounded lower-inner portion of the circular lower portion Y of the tunnel and does not continue to the free end of said portion Y. Further, the intermediate outer wall Z which extends between the outer rounded side of the upper portion X and the upper outer part of the lower circular portion Y of the tunnel is somewhat smoother and is less acutely formed than in the D-shaped to rectangular tunnel configuration.

In FIGS. 10, 11 and 12 of the drawings, I have illustrated the general form and relationship of a tunnel established in accordance with the present invention and having a cylindrical lower portion, in dotted lines.

FIG. 13 of the drawings illustrates a curved, rectangular tunnel configuration. The heavy, feathered arrows indicate the direction in which a column of fuel and air is urged and caused to flow and compress toward the outside curvature of the tunnel as the column is caused to turn or bend and which results in separation of fuel and air and an uneven fuel and air mixture throughout the tunnel. The small, light arrows in the corners of the tunnel indicate the dead area in such tunnels and the flow impeding turbulence that is created therein.

FIG. 13 is of the drawings illustrates a curved, cylindrical tunnel configuration. The heavy, feathered arrows indicate the direction in which a column of fuel and air is urged and caused to flow and compress towards the outside curvature of the tunnel as the column is caused to turn or bend and which results in separation of fuel and air and an uneven fuel and air mixture throughout the tunnel. The small, light arrows indicate the circular vortex flow which tends to form in circular tunnels and which tends to cast and urge the heavy fuel radially outwardly onto the walls of the tunnel and which results in separation of the fuel and air with undesirable and detrimental effect.

It will be apparent that with the D-shaped to rectangular or round tunnel configuration that I provide inhibits the establishment of vortex flow such as is established in cylindrical or round tunnels, establishes but two corners that may be considered dead space and in which flow impeding turbulence might be created instead of four such corners as are present in rectangular tunnels. In accordance with the above, it will be apparent that the novel tunnel configuration provided by the present invention effectively utilizes the advantages to be found in round and rectangular manifold tunnels and avoids or greatly reduces or diminishes the disadvantages to be found in either of the noted standard or conventional rectangular and round tunnels.

In carrying out the present invention, the flat, slide surface defining side of the tunnel is in normal to and follows the outside curvature of the tunnel, through both simple and compound curves. With such a construction and relationship, the flat, force distributing column directing slide surface is disposed for most effective turning of the fuel-air column at all times and at no time is there presented inclined and/or converging surfaces at and along the line of outside curvature and which would result in uneven distribution of those forces exerted by the fuel-air column as it is turned and which would result in adverse flow characteristics, such as is common in conventional compound curved tunnels of rectangular cross section.

The structure thus far described is such that by providing carburetor mounting pads on or at the upper ends of the groups of tunnels, a complete and operable intake manifold would be established. However, in the form of the invention illustrated, the casting establishing the tunnels and which will hereinafter be referred to as the lower or primary casting, is provided with machined, flat, upwardly disposed support surfaces 30 about the upper open ends of the noted groups of tunnels.

The support surfaces are adapted to engage and support an elongate, plenum chamber defining log L, which log or chamber is is adapted to occur between and establish communication with and between the several tunnels and the carburetors C.

The log L is an elongate fabricated structure made up of two castings, there being a top casting 31 and an intermediate casting 32 which occurs between the lower primary casting and top casting.

The intermediate casting is an elongate unit having a concavo-bottom wall 33 and upwardly curved side and end walls 34 and 35 about the bottom wall and terminating to define a flat upwardly disposed rim surface 36. The bottom wall 33 is provided with longitudinally spaced, downwardly projecting enlargements with flat, downwardly disposed surfaces 30' to mate with the mounting surfaces 30 on the lower primary casting. The bottom wall and the noted enlargements thereon are provided with vertical D-shaped ports 37 corresponding in arrangement and in configuration with the upper open ends of the tunnels T and register with the tunnels.

The top casting 31 is a substantially flat cover platelike unit corresponding in plane configuration with the intermediate casting 32 and has a downwardly disposed surface 38 about its perimeter to mate with the rim surface of the intermediate casting.

The top casting is further provided with a pair of longitudinally spaced upwardly projecting carburetor mounting pads 40 which occur in vertical alignment with groups of ports 37 and tunnels T related thereto. The pads 40 correspond in outside plane configuration with the standard shape of carburetor mounting pads provided on standard or conventional intake manifold and, like standard carburetor mounting pads, are provided with a flat top surface 41 to mate with the bottom surface 42 of the mounting flanges 43 of a related carburetor with fastener receiving openings 44 to receive fasteners to secure the carburetor to the pads and with central substantially rectangular inlet openings 45 communicating with the central, downwardly opening discharge openings 46 of carburetors related thereto, as clearly illustrated in the drawings.

The top central and lower castings are releasably secured together in predetermined operative relationship by a plurality of longitudinally and laterally spaced bolts 47 engaged in or through registering fastener receiving openings in the several castings and as clearly illustrated in the drawings.

An important feature of the log L that I provide resides in the fact that the side and bottom walls cooperate to define a concaved lower inside surface and the ports 37 communicate with the lowermost portion thereof. With such a relationship of parts, raw fuel condensed or otherwise deposited on the walls of the plenum chamber, defined by the log, are free to run down said walls to the bottom and drain, immediately down through the ports 37 into the tunnels. Accordingly, the possibility of raw fuel collecting and standing in the log is eliminated and the disadvantages and hazards that would result if raw fuel was to so collect are eliminated.

In regards to the above, it is to be noted that the collecting and holding of raw fuel is a disadvantage common to many manifolds provided by the prior art and which are provided with plenum chambers.

Another important feature in the manifold construction that I provide is a vertical alignment of the openings 45 and the groups of ports 37 related thereto. With such a relationship of parts, the flow of fuel and air discharged by each carburetor C is free to flow downwardly through the openings 45, through the chamber defined by the log and directly into the ports 37 for continued flow through the tunnels T to inlet ports of the engine. The discharge from the carburetors, therefore, is free to flow through the plenum chamber defined by the log as free standing columns and is not interrupted or caused to turbulate, bend or adversely defuse.

In the ordinary manifold where a plenum chamber is arranged between the carburetors and tunnels, the inlet openings to the chamber are misaligned with the tunnels related thereto for the express purpose of preventing the free flow of fuel and air from the carburetors to the tunnels and so that turbulence, intended to mix the fuel and air more completely, is established.

While the above ends sought to be gained can be advantageous under some operating conditions, they are not desirable when the throttle valves of the carburetors are fully open for the purpose of gaining maximum acceleration of the related engine, as the inability for the fuel to flow directly from the carburetors into the tunnels, but instead, to turbulate in the chamber, results in notable time delaying of the fuel reaching the tunnels and notable sluggishness of response and operation of the engine.

With the aligned relationship of the openings 45 and the ports 37 in the present invention, a limited and desirable amount of turbulence and blending of fuel and air can take place in the plenum chamber, but when operating conditions of the engine require, the fuel and air mixture can flow directly and substantially undisturbed from the carburetors through the chamber and into the tunnels for rapid and positive response.

The principal and desirable ends sought to be gained by provision of the log L is the balancing of manifold pressures between the carburetors and across the upper open inlet ends of the tunnels. Such balancing of pressures assures a better and more uniform distribution of fuel to the several tunnels and the cylinders of the engine related thereto, assures smoother engine operation throughout the lower and moderate operating speeds and facilitates fine tuning of the engine.

During low and moderate operating speed of the engine and low or moderate flow demand on the manifold, the plenum chamber established by the log L permits limited and desired turbulence, with resulting better blending of fuel and air. In extreme cases, the chamber is even capable of effecting a crossover and blending of the fuel and air from one carburetor to the other, but, upon maximum flow demand being placed upon the manifold, substantially free, straight-through flow of fuel and air is assured.

In order to gain the above-noted flow characteristics, it has been determined that the vertical extent of the plenum chamber with respect to the minor cross-sectional dimension of the inlet opening 45 must be limited so as not to exceed as said minor dimension of the opening 45. That is, it has been found most effective and desirable to establish the chamber so that the vertical extent of the columns of fuel, as they extend freely through the chamber, is substantially equal to, but does not exceed the minor cross-sectional dimension of said columns. Such proportional relationship of the free flowing columns of fuel and air sufficiently limits the extent of the free standing columns of fuel and air flowing through the chamber so that excessive dispersion of the said columns will not occur when the manifold is subjected to maximum flow demand.

It will be apparent that the cast sections forming the log L, like the lower casting forming the tunnel portion of my manifold, can be fabricated of sheet metal or established in any suitable manner without departing from the spirit of the invention.

Having described only a typical preferred form and application of my invention, I do not wish to be limited or restricted to the specific details herein set forth, but wish to reserve to myself any modifications and/or variations that may appear to those skilled in the art.

I claim:

1. An elongate manifold having opposite ends, opposite sides and a top and a bottom, said manifold having fuel-air inlet means at its top to communicate with carburetion means, a plurality of elongate fuel-air conducting tunnels with upwardly disposed upper inlet ends below and communicating with the carburetion means and longitudinally space, substantially laterally disposed lower outlet ends to oppose and communicate with spaced air-fuel inlet ports of a related, reciprocating internal combustion engine, said tunnels being curved downwardly and laterally outwardly as they extend from their upper to their lower ends and being D-shaped in cross section, the flat side of each D-shaped tunnel occurring at and along the outside curvature of the tunnel on planes normal to the central radial plane of the tunnel occurring on the line of outside curvature of said tunnel whereby the flat side of the tunnel defines a flat, curved sliding surface to direct and bend a moving column of fuel and air in the tunnel freely therethrough.

2. A manifold as set forth in claim 1 wherein said tunnels are of compound curvature and extend longitudinally and laterally downwardly and outwardly as they extend from their upper to their lower ends.

3. A manifold as set forth in claim 1 wherein the upper open ends and the upper major longitudinal extent of the tunnels are D-shaped in cross section, the lower, outer open ends of the tunnels are substantially circular in cross section to register with substantially circular ports in an engine related thereto and are formed throughout their lower minor longitudinal extent to fare smoothly between and to join the lower part of the D-shaped portions and their outer open ends.

4. A structure as set forth in claim 3 wherein said tunnels are of compound curvature and extend longitudinally and laterally downwardly and outwardly as they extend from their upper to their lower ends.

5. A manifold as set forth in claim 1 wherein the upper open ends and the upper major longitudinal extent of the tunnels are D-shaped in cross section, the lower outer open ends of the tunnels are polygonal in cross section to register with substantially polygonal ports in an engine related thereto and are formed throughout their lower minor longitudinal extent to fare smoothly between and to join the lower part of the D-shaped portions and their outer open ends.

6. A manifold as set forth in claim 5 wherein a side of said lower minor portions establishes a continuation of said slide surfaces and terminates at one of the sides of the polygonal open ends.

7. A manifold as set forth in claim 5 wherein said tunnels are of compound curvature and extend longitudinally and laterally downwardly and outwardly as they extend from their upper to their lower ends.

8. A manifold as set forth in claim 5 wherein a side of said lower minor portions establishes a continuation of said slide surfaces and terminates at one of the sides of the polygonal open ends, said tunnels being of compound curvature and extending longitudinally and laterally downwardly and outwardly as they extend from their upper to their lower ends.

9. A structure as set forth in claim 1 wherein said carburetion means includes an elongate log overlying and communicating with the upper open ends of the tunnels, longitudinally spaced carburetors mounted on and communicating with the log, said log defining a plenum chamber for fuel and air between and communicating with the carburetors and the tunnels, said upper open ends of the tunnels being arranged to occur at opposite sides of the log from the carburetors and in axial alignment therewith.

10. A structure as set forth in claim 1 wherein said carburetion means includes an elongate log overlying and communicating with the upper open ends of the tunnels, a pair of longitudinally spaced carburetors mounted on and communicating with the log, said log defining a plenum chamber for fuel and air between and communicating with the carburetors and the tunnels, said upper open ends of the tunnels being two longitudinally spaced groups arranged to occur at opposite sides of the log from the carburetors and in axial alignment therewith.